Figure 2:
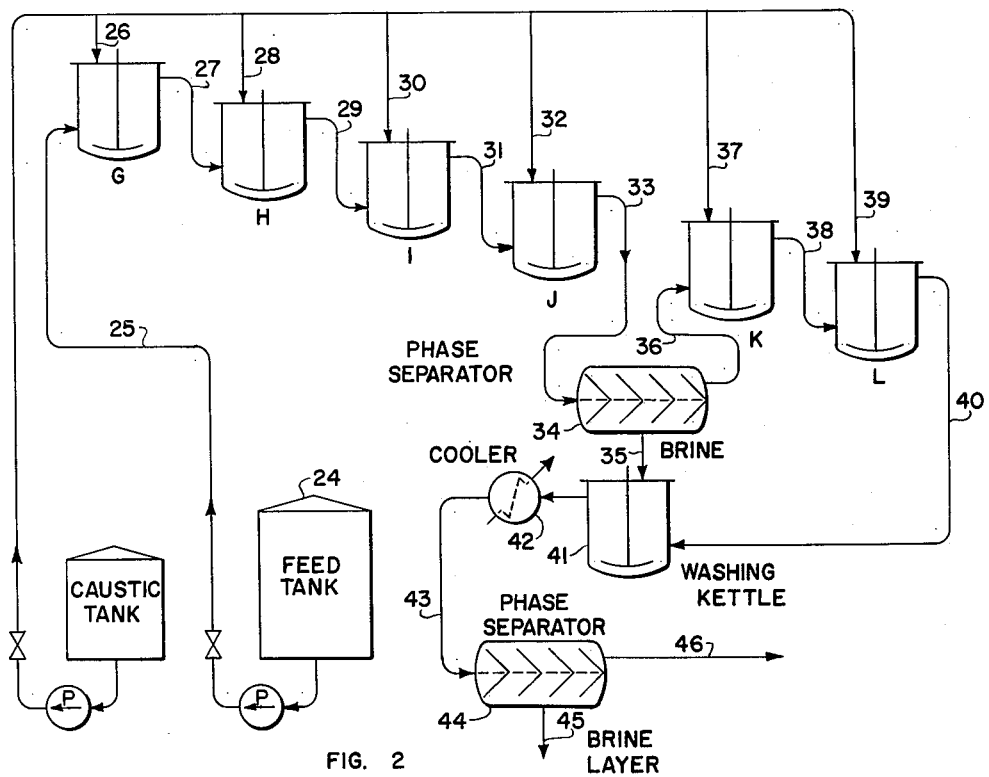
Figure 1:
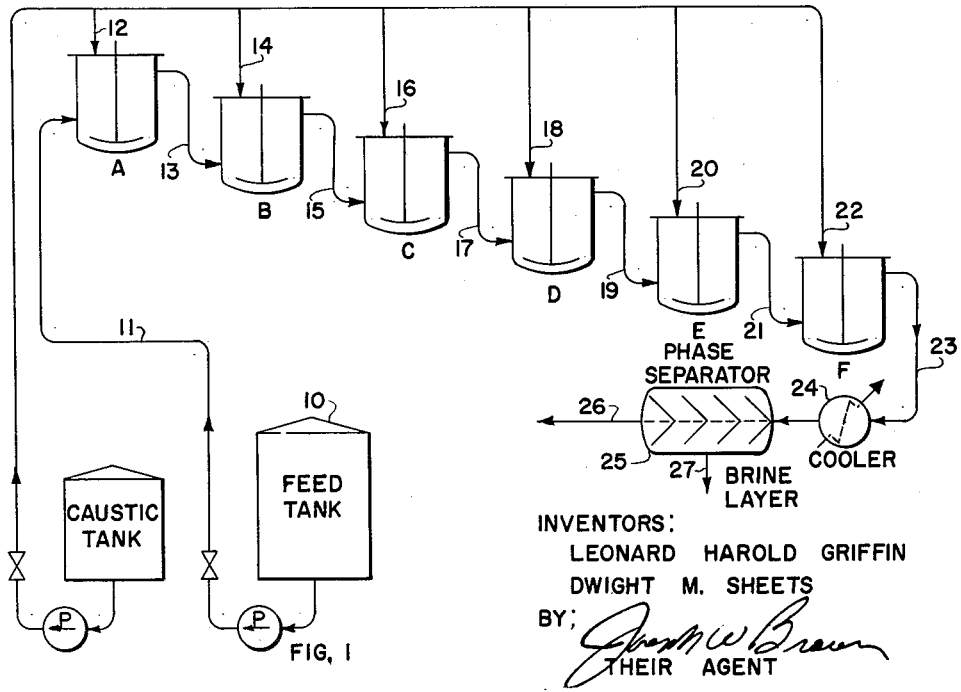

May 30, 1961 L. H. GRIFFIN ET AL 2,986,551
CONTINUOUS PROCESS FOR PREPARING GLYCIDYL
POLYETHERS OF POLYHYDRIC PHENOLS
Filed Oct. 4, 1957

INVENTORS:
LEONARD HAROLD GRIFFIN
DWIGHT M. SHEETS
BY;
THEIR AGENT 2,986,551
Patented May 30, 1961

2,986,551
CONTINUOUS PROCESS FOR PREPARING GLYCIDYL POLYETHERS OF POLYHYDRIC PHENOLS

Leonard Harold Griffin, Pasadena, and Dwight M. Sheets, Houston, Tex., assignors to Shell Oil Company, a corporation of Delaware Filed Oct. 4, 1957, Ser. No. 688,358

12 Claims. (Cl. 260—47)

This invention relates to a process for preparing glycidyl polyethers. More particularly, the invention relates to a new process for preparing glycidyl polyethers of polyhydric phenols in a continuous manner.

Specifically, the invention provides a new and highly efficient process for preparing on a continuous basis glycidyl polyethers of polyhydric phenols, and preferably liquid grade glycidyl ethers of polyhydric phenols. This process comprises continuously introducing into the first of a series of reaction zones epichlorohydrin or glycerol dichlorohydrin and polyhydric phenol in a mol ratio varying from 5:1 to 25:1, water and acetone in an amount such that the weight ratio of epichlorohydrin or glycerol dichlorohydrin to acetone is about 1:1 to 1:0.5 and continuously passing this mixture into a series of at least two other separate reaction zones wherein in each zone (1) the mixture is maintained under agitation to effect intimate contact of the reactants, (2) the temperature of the mixture is maintained between 100° F. and 180° F. and (3) a portion of the equivalent amount of alkali metal hydroxide is added as an aqueous solution in each zone, the total amount of water in the mixture after it is removed from the last reactor being between 7% and about 18% by weight, continuously removing the reaction mixture from the last zone to a phase separator, separating the organic phase and recovering the glycidyl polyether therefrom.

Glycidyl polyethers of polyhydric phenols may be represented by the following general formula

wherein $n$ is an integer of the series 0, 1, 2, 3, etc., and R represents the divalent radical to which the two phenolic hydroxyl groups are attached to the polyhydric phenol. When $n$ is 0, the product is a liquid grade resin having a high epoxy value, and for most intended use of this resin it is highly desirable that it be free of the higher molecular weight products.

The liquid grade resin of high quality has been prepared heretofore on a commercial basis by a batch process wherein a substantial excess of epichlorohydrin is combined with the polyhydric phenol (e.g. Bisphenol A) and the necessary amount of sodium hydroxide added and the mixture heated to form the desired product. The mixture is then treated to remove the formed salt and the glycidyl ether recovered. This method is rather time consuming, expensive and gives slight variations in properties from batch to batch, and for commercial operations it would be highly desirable to have a continuous method for making the resins which would avoid these difficulties.

Various attempts have been made in the past to convert the above batch process to continuous operation, but the attempts heretofore have not been very satisfactory. Attempts to make the process continuous, for example, by merely continuously feeding in the excess epichlorohydrin and polyhydric phenol with continuous addition of sodium hydroxide and then continuous withdrawal of the product from the reaction zone were not successful, chiefly because the product contained almost four times the higher molecular weight resins than obtained by the batch process.

Attempts have also been made to obtain a continuous process by the addition of solvents, such as isopropyl alcohol, but the results obtained from these processes were also not satisfactory. In some cases, for example, there was reaction of the solvent to form undesirable by-products. This reduced the yield as well as gave a modified glycidyl polyether that was unsuited for many end uses. In other cases, the presence of the solvent made the removal of the salt more difficult, and in other cases, the recovery of the solvent was difficult and expensive.

It is an object of the invention, therefore, to provide a new process for preparing glycidyl polyethers. It is a further object to provide a new process for preparing glycidyl polyethers which is a true continuous process. It is a further object to provide a new process for preparing glycidyl polyethers on a continuous basis which gives unexpectedly high quality of liquid grade resins. It is a further object to provide a new continuous process for making liquid grade glycidyl polyethers of polyhydric phenols which is substantially free of reaction between the solvent and reactants and/or product. It is a further object to provide a new continuous process for making glycidyl polyethers that permits easy removal of the salt. It is still a further object to provide a new process for continuous preparation of glycidyl ethers which permits easy recovery of solvent. It is a further object to provide a new continuous method for making glycidyl polyethers which give substantially the same high yields as the batch process. Other objects and advantages of the invention will be apparent from the following detailed description thereof and from the attached drawings which represent two examples of assemblage of apparatus that might be used in operation of the process of the invention. A detailed description of these drawings is given hereinafter.

It has now been discovered that these and other objects may be accomplished by the process of the invention which comprises continuously introducing into the first of a series of reaction zones epichlorohydrin or glycerol dichlorohydrin and polyhydric phenol in a mol ratio varying from 5:1 to 25:1, water and acetone in an amount so that the weight ratio of epichlorohydrin or glycerol dichlorohydrin to acetone is about 1:1 to 1:0.5, and continuously passing this mixture into a series of at least two other separate reaction zones wherein in each zone (1) the mixture is maintained under agitation to effect intimate contact of the reactants, (2) the temperature of the mixture is maintained between 100° F. and 180° F. and (3) a portion of the equivalent amount of alkali metal hydroxide is added as an aqueous solution in each zone, the total amount of water in the mixture after it is removed from the last reactor being between 7% and about 18% by weight, removing the reaction mixture from the last zone to a phase separator, separating the organic phase and recovering the glycidyl polyether therefrom. It has been surprisingly found that by the use of this process one can obtain a uniform product which has exceptionally good quality. There appears to be no by-product formation due to the reaction of the acetone and there is no greater formation of the higher molecular weight resins than in batch process. In addition, the process permits easy removal of the salt from the resin, and the acetone can be easily separated and recycled. The unexpected superior advantages of the process are illustrated in the working examples at the end of the specification.

As noted, the mixture used in the process is a homogeneous mixture of epichlorohydrin or glycerol dichlorohydrin, polyhydric phenol, acetone and water. The epichlorohydrin or glycerol dichlorohydrin and polyhydric phenol are combined in a mol ratio varying from 5:1 to 25:1. The exact ratio selected will depend upon the type of product desired. Liquid grade resins of the type described in the formula where in $n$ is 0, are obtained when the epichlorohydrin or glycerol dichlorohydrin to polyhydric phenol ratio is preferably between about 10:1 to 15:1. Resins wherein $n$ is 1 or 2, are obtained by decreasing the amount of epichlorohydrin or glycerol dichlorohydrin and using ratios say from 5:1 to about 9:1.

The amount of acetone in the mixture is of great importance and care should be exercised in selecting the right proportions. The amount of acetone in the mixture will depend upon the amount of epichlorohydrin or glycerol dichlorohydrin and the ratio of epichlorohydrin or dichlorohydrin to acetone should be between 1:1 to 1:0.5.

The water in the mixture should preferably be at least 2.5% by weight and more preferably between 2.5% and 7%. The amount of the water at the end of the process should be between 7% and 18% by weight. In case there is a tendency for some of the sodium phenate to settle out, small amounts of water may be injected in one or more zones. If the glycerol dichlorohydrin is employed as reactant additional water may also be needed for removal of the additional salt formed.

The alkali metal hydroxide added to each zone is preferably sodium hydroxide, but other hydroxides such as potassium or lithium hydroxide may also be used.

The alkali metal hydroxide is added as an aqueous solution and preferably a 12.5% to 45% by weight aqueous solution.

The alkali metal hydroxide is added portionwise to each of the reaction zones. The amounts added to each zone need not be equal but in most cases preferably are. In some cases, it may be desirable to add more of the caustic during the earlier part of the reaction say in a six zone arrangement one may add 25% in the first reaction zone and 15% in each of the succeeding zones.

The total amount of alkali metal hydroxide used in the process is an equivalent of the hydroxide per equivalent of the epichlorohydrin reacted. In the present process wherein the polyhydric phenol is reacted with a large excess of epichlorohydrin, the amount of the alkali metal hydroxide will vary from about 1.05 to 1.5 mol per phenolic hydroxyl equivalent weight. In reacting epichlorohydrin with a dihydric phenol, there should preferably be 2.1 to 2.2 mols of alkali metal hydroxide per mol of dihydric phenol. The important point is that sufficient hydroxide as a whole should be used that the ether product leaving the last reaction zone is substantially free of organically bound chlorine and that the reaction mixture is substantially neutral. If glycerol dichlorohydrin is employed as reactant, additional alkali metal hydroxide will be needed to bring about in situ formation of epichlorohydrin, e.g. an additional mol of alkali metal hydroxide per mol of dichlorohydrin.

The temperature used in the reaction zones will vary from about 100° F. to about 180° F. or even 190° F. It is generally preferred to maintain the temperature as close to boiling as possible in order to speed the reaction and cut down the residence time in each reaction zone. Pressure may be utilized if needed to operate at the higher temperature and still maintain the mixture in the liquid phase. With temperatures varying from about 100° F. to 160° F., the residence time in each zone will vary from about 8 to 15 minutes. At temperatures in the range of 180° F. (10 p.s.i.g.) the residence time can be reduced to about 3–5 minutes. The temperature is preferably kept at about the same level in each zone.

As noted, the reaction mixture should be subjected to agitation in each reaction zone so as to maintain intimate contact between the reactants. This agitation can be accomplished by any suitable means, such as paddles, agitators and the like. Use of agitators at the rate of about 100 to 500 r.p.m. is generally sufficient.

The mixture recovered from the last reaction zone is then allowed to separate into an organic phase which contains the glycidyl polyether, acetone and excess epichlorohydrin and an aqueous phase which contains predominantly water and salt. The separation may be accomplished at any suitable temperature but it is preferred to cool the mixture before effecting separation. The aqueous layer which contains the salt may be discarded or subjected to distillation to remove any epichlorohydrin and acetone.

In a preferred operation of the process of the invention, an additional phase separator is introduced before the last one or two reaction zones (as shown in Figure II explained below) and then the aqueous phase removed and later used to wash the reaction mixture before the last and final separation. It has been found that this special feature permits one to obtain glycidyl ethers having very low chlorine content.

If the amount of alkali metal hydroxide is employed as noted above, neutralization of the reaction mixture before separation and recovery of the glycidyl polyether is not needed. However, if excess alkali metal hydroxide is present, neutralization with materials, such as sodium hydrogen phosphate, may be desirable before separation and recovery.

The glycidyl ether may be recovered from the organic phase by any suitable means. It is preferably accomplished by distillation under vacuum and recovery of the glycidyl ether as bottoms product.

To illustrate more or less diagrammatically how the novel process of the invention may be operated, reference is made to the accompanying drawings showing assemblage of apparatus for the production of liquid grade glycidyl polyethers of 2,2-bis(4-hydroxy-phenyl)propane. The drawings are attached as examples only and should not be regarded as limiting the invention in any way.

Referring to Figure I, epichlorohydrin (ECH), 2,2-bis-(4-hydroxyphenyl)propane (BPA), acetone (DMK) and water are mixed in feed tank 10 and then passed through line 11 into reactor A. Aqueous sodium hydroxide is introduced into reactor A through line 12 and the combined mixture is agitated and maintained at a temperature of about 150° F. to 160° F. The mixture is taken through line 13 to reactor B. Aqueous sodium hydroxide is introduced to reactor B through line 14 and the combined mixture is agitated and maintained at a temperature of about 150° F. to 160° F. The mixture is then taken through line 15 to reactor C. Aqueous sodium hydroxide is introduced to reactor C through line 16 and the combined mixture is agitated and maintained at a temperature of about 150° F. to 160° F. The mixture is then taken through line 17 to reactor D. Aqueous sodium hydroxide is introduced to reactor D through line 18 and the combined mixture is agitated and maintained at a temperature of about 150° F. to 160° F. The mixture is then taken through line 19 to reactor E. Aqueous sodium hydroxide is introduced to reactor E through line 20 and the combined mixture is agitated and heated as in the other reactors. The mixture is then taken through line 21 to reactor F. Aqueous sodium hydroxide is introduced to reactor F through line 22 and the mixture is agitated and heated as in the other reactors. The mixture is taken from reactor F to a cooler 24 and thence to the phase separator 25 wherein the brine layer is removed through line 27 and the organic layer is removed through line 26 and taken to a distillation column to remove the excess epichlorohydrin and acetone.

A still more preferred method of operating the process is shown in Figure II. This differs from the set up in Figure I in that a phase separator is placed between the fourth and fifth reaction zone, and the brine recovered therefrom is used to wash the reaction mixture recovered from the sixth zone before the mixture is taken to the last phase separator. This method of operation gives products which have lower chlorine content, the dehydrochlorination in the fifth and sixth reaction zones being accomplished more efficiently in the absence of the brine solution.

The detailed operation of the process as outlined in Figure II is as follows: The epichlorohydrin, 2,2-bis(4-hydroxyphenyl)propane, acetone and water are mixed in feed tank 24 and taken to reactor G through line 25. Aqueous sodium hydroxide is introduced through line 26 and the mixture is agitated in reactor G and heated to 150° F. to 160° F. The mixture is then taken through line 27 to reactor H. Aqueous sodium hydroxide is introduced through line 28 and the mixture is agitated in reactor H and heated as in reactor G. The mixture is then taken through line 29 to reactor I. Aqueous sodium hydroxide is introduced through line 30 and the mixture is agitated in reactor I and heated as in G. The mixture is then taken through line 31 to reactor J. Aqueous sodium hydroxide is introduced through line 32 and the mixture is agitated and heated as in the other reactors. The mixture is taken through line 33 to a phase separator 34 where the brine layer is removed through line 35 and used to wash the mixture recovered from reactor L. The organic layer from phase separator 34 is taken through line 36 to reactor K. Aqueous sodium hydroxide is introduced through line 37 and the mixture is agitated and heated as in the other reactors. The mixture is then taken through line 38 to reactor L. Aqueous sodium hydroxide is introduced through line 39. The mixture is agitated and heated and taken out through line 40 to washing kettle 41 where it is washed with the brine solution, removed from the first phase separator. The mixture is taken from the washing kettle to a cooler 42 and thence through line 43 to phase separator 44 where the organic layer is removed through line 46 and taken to distillation column for removal of the excess epichlorohydrin and the acetone, and the brine layer is recovered at line 45.

Although the process of the invention is particularly suitable for continuous production of glycidyl ethers of dihydric phenols, it may be used for efficient manufacture of glycidyl ethers of any suitable polyhydric phenol. Typical phenols include those having phenolic hydroxyl groups attached to nonadjacent ring carbon atoms such as resorcinol, hydroquinone, chlorohydroquinones, methyl resorcinol, phloroglucinol, 1,5 - dihydroxynaphthalene, 4,4' - dihydroxydiphenyl, bis(hydroxyphenyl)methane, 1,1 - bis(4 - hydroxyphenyl)ethane, 1,1 - bis(4 - hydroxyphenyl)isobutane, 2,2 - bis(4 - hydroxyphenyl)propane, which is termed bis-phenol herein for convenience, 2,2 - bis(2 - hydroxy - 4 - tert - butylphenyl)propane, 2,2-bis(2-hydroxyphenyl)propane, 2,4'-dihydroxydiphenyldimethylmethane, 2,2 - bis(2 - chloro - 2 - hydroxyphenyl)propane, 2,2-bis(2-hydroxynaphthyl)pentane, 2,2-bis(2,5 - dibromo - 4 - hydroxyphenyl)butane, 4,4' - dihydroxybenzophenone, 1,3 - bis(4-hydroxyphenyloxy)-2-hydroxypropane, 3-hydroxyphenyl salicylate, 4-salicoylaminophenol, as well as more complex polyhydric phenols such as novolac resins obtainable by acid catalyzed condensation of phenol, p-cresol, or other substituted phenols with aldehydes such as formaldehyde, acetaldehyde, crotonaldehyde, etc.; condensates of phenols with cardanol such as described in U.S. 2,317,607; condensates of phenols with aliphatic diols such as described in U.S. 2,321,620; and condensates of phenols with unsaturated fatty oils such as described in U.S. 2,031,586. The polyhydric phenols contain 2 or more phenolic hydroxyl groups in the average molecule thereof and are free of other functional groups which would interfere with formation of the desired glycidyl ethers.

To illustrate the manner in which the invention may be carried out, the following examples are given. It is to be understood, however, that the examples are for the purpose of illustration and the invention is not to be regarded as limited to any of the specific reactants or conditions recited therein. Unless otherwise indicated, parts disclosed in the examples are parts by weight.

*Example I*

This example illustrates the use of the process of the invention in preparing a liquid grade glycidyl polyether of 2,2-bis(4-hydroxyphenyl)propane of high quality.

The apparatus used was one similar to that shown in Figure II. The reactor kettles are designated as in Figure II. The reactors had a volume of about 500 milliliters.

A feed mixture was prepared by mixing 925 parts of epichlorohydrin, 228 parts of 2,2-bis(4-hydroxyphenyl)propane, 925 parts of acetone and 157 parts of water. (This amount of water plus that added with the caustic feed plus that formed in the reaction gives an over all water concentration of about 18% by weight in the final two-phase reaction mass.) This mixture was introduced into the first reactor (reactor G) at a rate of about 2700 parts/hr. 70 parts per hour of 25% aqueous sodium hydroxide were added to reactor G. This represents ⅛ of the total sodium hydroxide to be added. From reactor G the mixture passed by gravity flow to reactor H and from reactor H to reactor I and from recator I to reactor J. In each reactor, 70 parts of the 25% aqueous sodium hydroxide per hour was added. Agitation was maintained in each reactor at the rate of about 500 r.p.m., and the temperature of each reactor was about 160° F. Residence time in each reactor was about 10 minutes.

From reactor J the reaction mixture passed to a phase separator where the mixture was allowed to separate into an organic layer and an aqueous layer. The temperature in the phase separator was about 150° F. The organic layer was then taken to reactor K where it was mixed with 70 more parts of the 25% aqueous sodium hydroxide and thence by gravity flow to reactor L where it was reacted with an additional 70 parts per hour of 25% aqueous sodium hydroxide. The temperature and agitation in J and K were as in the other reactors and the residence time for each was about 10 minutes. The mixture was then taken to a washing kettle where it was washed at a temperature of about 150° F. with the brine layer obtained from the phase separator (No. 34 in Figure II). The mixture was cooled to a temperature of about 95° F. and taken to a second phase separator (No. 44 in Figure II). The aqueous brine layer was continuously withdrawn and discarded. The organic layer was continuously withdrawn from the phase separator and subjected to distillation under vacuum to yield the desired glycidyl ether. The resulting product had an average molecular weight of 366 as determinted ebullioscopically in ethylene dichloride, and an epoxy value of 0.520 eq./100 g. Analysis showed this epoxy resin contained very little of the higher molecular weight product. The epoxy resin had a viscosity of 150 poises at 25° C., 0.2% by weight of saponifiable chlorine and 0.008 eq./100 g. of phenolic OH.

The yield of resin obtained showed a consumption of 0.69 pound of the 2,2-bis(4-hydroxyphenyl)propane and 0.61 pound of epichlorohydrin for every pound of resin. This is in contrast to a theoretical consumption of 0.671 pound of the 2,2-bis(4-hydroxyphenyl)propane and 0.545 pound of epichlorohydrin. Thus, it appears that excessive side reactivity does not occur in this continuous system.

A portion of the resin prepared by the above continuous process was heated with 20 parts (per 100 parts of the resin) of a curing agent made up of a reaction product of meta-phenylene diamine and phenyl glycidyl ether for 2 hours at 80° C. followed by 1 hour at 200° C. The resulting casting which was a hard strong product had an average heat distortion point of 145° C., a compressive yield strength of 9,000 p.s.i. and a modulus of 427,000 p.s.i. This indicates that the resin could be easily cured to form products of high quality.

*Example II*

This example illustrates the advantage of the present continuous process over other methods for making the glycidyl ethers in a continuous manner.

(1) A continuous production of glycidyl ether of 2,2-bis(4-hydroxyphenyl)propane was effected in a single stage reaction system. In this case the feed consisted of a solution of 2,2-bis(4-hydroxyphenyl)propane and epichlorohydrin containing a mole ratio of epichlorohydrin to phenol of 8/1. The solution was introduced into the single reactor along with a 40% aqueous sodium hydroxide solution. The mixture was stirred and heated at about 107° C. with removal of water by azeotropic distillation with epichlorohydrin. The crude reaction product was withdrawn at such a rate that the reactor was maintained substantially full of reaction mixture. The glycidyl ether was isolated as in the preceding example. Analysis of the resulting resin showed that it contained about 36 mol percent of the higher molecular weight product.

(2) The process of Example I was repeated using methyl isobutyl ketone in place of the acetone. The results were unsatisfactory because of the side reactions involving the methyl isobutyl ketone and reactants.

(3) A continuous process for making the glycidyl ether of 2,2-bis(4-hydroxyphenyl)propane was attempted using ethyl alcohol as the solvent. This was also unsuccessful due to the low yields and side reactions.

*Example III*

The process shown in Example I was repeated with the exception that the mole ratio of epichlorohydrin to 2,2-bis(4-hydroxyphenyl)propane was 8/1 instead of 10/1. The resulting product was a liquid grade resin of high quality. The product had a molecular weight of 355, an epoxy value of 0.520 eq./100 g. The resin had a viscosity of 180 poises at 25° C., 0.2% by weight of saponifiable chlorine and 0.007 eq./100 g. of phenolic OH. This resin could also be cured with meta-phenylene diamine-phenyl glycidyl ether reaction product to form hard tough castings having good physical properties.

*Example IV*

The process shown in Example I was also repeated with the exception that the mole ratio of epichlorohydrin to 2,2-bis(4-hydroxyphenyl) propane was 15/1 instead of 10/1. The resulting product was a liquid grade resin of high quality. The product had an epoxy value of 0.527. The resin had a viscosity of 85 poises at 25° C., 0.2% saponifiable chlorine and 0.004 eq./100 g. phenolic OH. This resin could also be cured with metaphenylene diamine-phenyl glycidyl ether reaction product to form hard tough castings having good physical properties.

*Example V*

The process shown in Example I is repeated using a 20% caustic solution instead of 25%. A resin of high quality is obtained.

*Example VI*

The process shown in Example I was also repeated with the exception that the NaOH used was 2.1 mol per mole of 2,2-bis(4-hydroxyphenyl)propane. This process also yielded a resin of high quality as shown in Example I.

*Example VII*

The process of Example I was repeated with the exception that the recovered acetone and epichlorohydrin was recycled back to the feed mixture. The resulting resin still had high quality properties.

*Example VIII*

This example illustrates the preparation of a glycidyl polyether of 2,2-bis(4-hydroxyphenyl)propane using an assemblage of apparatus similar to that shown in attached Figure I. The reactors will be designated as in Figure I. The capacity of the reactors was about 500 ml.

A feed mixture was prepared by mixing 42.1% epichlorohydrin, 10.4% 2,2-bis(4-hydroxyphenyl)propane, 42.1% acetone and 5% water. This mixture was introduced into the first reactor A at the rate of about 2700 parts per hour. 70 parts per hour of a 25% w. aqueous caustic solution was added to the reactor. From reactor A, the mixture passed by gravity flow to reactor B and from reactor B to reactor C, thence to reactor D, thence to reactor E and then to reactor F. In each reactor, 70 parts per hour of the 25% aqueous alkali solution was added. Agitation was maintained in each reactor at the rate of about 500 r.p.m., and the temperature of each reactor was about 160° F. Residence time in each reactor was about 10 minutes. The reaction mixture taken from reactor F was cooled and then taken to a phase separator. The brine layer was removed. The organic layer was removed and distilled under vacuum at 300° F. to recover the glycidyl polyether as bottoms product.

The resulting product had a molecular weight of about 349 and an epoxy value of 0.503 eq./100 g. The resin had a viscosity of 149 poises at 25° C., total chlorine by weight of 0.6% and phenolic OH of 0.018 eq./100 g. The resin contained very little high molecular weight materials and could be cured with meta-phenylene diamine-glycidyl phenyl ether reaction product to form hard tough castings having good physical properties.

An adhesive formulation prepared from the above resin had properties equal to that obtained from a similar resin prepared by a batch method.

*Example IX*

The process of Example VIII was repeated with the exception that the caustic was added in stages as a 12.5% solution. The resulting product was a liquid glycidyl polyether having a viscosity of 160 poises at 25° C., total chlorine of 0.8% and a phenolic OH of 0.018 eq./100 g.

*Example X*

Example VIII was repated with the exception that more than an equal share of the caustic was added in the first reactor (e.g. 25%) and the remaining portion in the last five reactors. The resulting resin still had good properties.

*Example XI*

The process of Example I is repated using temperature of 180° F. and 10 p.s.i.g. in the reactors and thus reducing residence time to about 3 to 5 minutes.

We claim as our invention:

1. A continuous process for preparing glycidyl polyethers of polyhydric phenols which comprises continuously introducing into the first of a series of reaction zones an epoxy-forming material of the group consisting of epichlorohydrin and glycerol dichlorohydrin, and polyhydric phenol in mol ratio varying from 5:1 to 25:1, water and acetone in an amount such that the weight ratio of epoxy-forming material to acetone is about 1:1 to 1:0.5, the amount of water varying from about 2.5% by weight to that amount that would give 18% by weight of water at the end of the last zone as described hereinafter and continuously passing this mixture into a series of at least two other separate reaction zones, in each of said zones (1) the mixture being maintained under agitation to effect intimate contact of the reactants, (2) the temperature being maintained between 100° F. and 180° F., and (3) a portion of the equivalent amount of alkali metal hydroxide being added portionwise in each zone, the total amount of water in the mixture after being removed from the last zone being between 10% and 18% by weight, continuously removing the reaction mixture from the last zone to a phase separator, separating the organic phase and recovering the glycidyl polyether therefrom.

2. A process as in claim 1 wherein the number of separate reaction zones is six.

3. A process as in claim 1 wherein the residence time in each zone is about 3 to 15 minutes.

4. A process as in claim 1 wherein the epichlorohydrin and polyhydric phenol are combined in a mole ratio of 10:1 to 15:1.

5. A continuous process for preparing glycidyl polyethers of polyhydric phenols which comprises continuously introducing into the first of a series of reaction zones an epoxy-forming material of the group consisting of epichlorohydrin and glycerol dichlorohydrin, and polyhydric phenol in mol ratio varying from 5:1 to 25:1, water and acetone in an amount that the weight ratio of epoxy-forming material to acetone is about 1:1 to 1:0.5 and the amount of water is from about 2.5 to 7% by weight and continuously passing this mixture into a series of at least two other separate reaction zones, in each of said zones (1) the mixture being maintained under agitation to effect intimate contact of the reactants, (2) the temperature being maintained between 100° F. and 180° F., and (3) a portion of the equivalent amount of alkali metal hydroxide as a 12.5 to 45% aqueous solution being added portionwise in each zone, the total amount of water in the mixture after being removed from the last zone being between 10% and 18% by weight, continuously removing the reaction mixture from the last zone to a phase separator, separating the organic phase and recovering the glycidyl polyether therefrom.

6. A process as in claim 1 wherein the polyhydric phenol is 2,2-bis(4-hydroxyphenyl)propane.

7. A continuous process for preparing liquid grade glycidyl polyethers of polyhydric phenols which comprises mixing epichlorohydrin and polyhydric phenol in a mole ratio varying from 10:1 to 15:1, acetone in amount such that the weight ratio of epichlorohydrin to acetone is about 1:1 to 1:0.5 and water in an amount of 2.5% to 7% of the feed mixture, to form a homogeneous mixture continuously passing this mixture into a series of four separate reaction zones wherein in each zone (1) the mixture is maintained under agitation to effect intimate contact of the reactants, (2) the temperature is maintained between 100° F. and 180° F. and (3) caustic soda as a 12.5% to 45% aqueous solution is added portionwise in each zone, the total caustic soda added in these four zones as well as in a 5th and 6th zone described hereinafter being about 2.1 to 2.2 mol per mol of the polyhydric phenol, and the total amount of water in the reaction mixture as withdrawn from the last zone is not greater than 18% by weight, continuously removing the reaction mixture from the fourth zone to a phase separator, continuously recovering the organic phase and passing it into a series of two separate reaction zones wherein conditions (1), (2) and (3) noted above are maintained, continuously removing the reaction mixture from the last zone to a phase separator, separating the organic phase and recovering the glycidyl polyether therefrom.

8. A process as in claim 7 wherein aqueous layer recovered from the first phase separator is used to wash the reaction mixture recovered from the six reaction zones.

9. A process as in claim 7 wherein the acetone and epichlorohydrin recovered from the separation of the glycidyl polyether in the last step is recycled to the feed mixture.

10. A process as in claim 7 wherein the acetone and epichlorohydrin in the feed mixture are in a weight ratio of 1:1.

11. A process as in claim 7 wherein the residence time in each of the six zones varies from 3 to 15 minutes.

12. A process as in claim 7 wherein the polyhydric phenol is 2,2-bis(4-hydroxyphenyl)propane.

References Cited in the file of this patent

UNITED STATES PATENTS

| | | |
|---|---|---|
| 2,616,872 | Bloem et al. | Nov. 4, 1952 |
| 2,642,412 | Newey et al. | June 16, 1957 |
| 2,801,227 | Goppel | July 30, 1957 |
| 2,848,435 | Griffin et al. | Aug. 19, 1958 |